United States Patent
Suzuki et al.

(10) Patent No.: US 10,029,681 B2
(45) Date of Patent: Jul. 24, 2018

(54) VEHICLE ERRONEOUS START CONTROL DEVICE

(71) Applicant: DENSO CORPORATION, Kariya, Aichi-pref. (JP)

(72) Inventors: Youichirou Suzuki, Nishio (JP); Akira Takaoka, Nishio (JP); Takashi Saitou, Nishio (JP); Nobuya Watabe, Kariya (JP); Masashi Mori, Kariya (JP); Takatoshi Sekizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 134 days.

(21) Appl. No.: 15/126,457

(22) PCT Filed: Mar. 12, 2015

(86) PCT No.: PCT/JP2015/001396
§ 371 (c)(1),
(2) Date: Sep. 15, 2016

(87) PCT Pub. No.: WO2015/141201
PCT Pub. Date: Sep. 24, 2015

(65) Prior Publication Data
US 2017/0080927 A1    Mar. 23, 2017

(30) Foreign Application Priority Data
Mar. 18, 2014   (JP) ................. 2014-054931

(51) Int. Cl.
*B60W 30/08*   (2012.01)
*B60C 19/00*   (2006.01)
(Continued)

(52) U.S. Cl.
CPC ............ *B60W 30/08* (2013.01); *B60C 19/00* (2013.01); *B60K 28/14* (2013.01);
(Continued)

(58) Field of Classification Search
CPC ...... B60W 30/08; B60W 10/04; B60W 10/18; B60W 50/12; B60W 2550/10;
(Continued)

(56) References Cited

U.S. PATENT DOCUMENTS

2012/0330493 A1* 12/2012 Hanatsuka .............. B60T 8/172
                                                          701/29.1

FOREIGN PATENT DOCUMENTS

JP    2002079815 A    3/2002
JP    2005059800 A    3/2005
(Continued)

*Primary Examiner* — Calvin Cheung
(74) *Attorney, Agent, or Firm* — Harness, Dickey & Pierce, P.L.C.

(57) ABSTRACT

An erroneous start is controlled based on vibrations of a tire, irrespective of a poor visibility or an algorithm of an image processing. A tire-side unit detects a vibration of a tire when the tire has collided with a wheel stop or the like, and outputs collision data to a vehicle-side unit. The vehicle-side unit determines an erroneous start of the vehicle. Therefore, the erroneous start of the vehicle can be controlled without being affected by the poor visibility or the algorithm of the image processing as in a case of utilizing a camera or a radar.

4 Claims, 2 Drawing Sheets

(51) Int. Cl.
*B60W 50/12* (2012.01)
*B60K 28/14* (2006.01)
*B60R 16/023* (2006.01)
*B60W 10/04* (2006.01)
*B60W 10/18* (2012.01)

(52) U.S. Cl.
CPC ......... *B60R 16/0232* (2013.01); *B60W 10/04* (2013.01); *B60W 10/18* (2013.01); *B60W 50/12* (2013.01); *B60C 2019/004* (2013.01); *B60W 2550/10* (2013.01)

(58) Field of Classification Search
CPC ... B60C 19/00; B60C 2019/004; B60K 28/14; B60R 16/0232
See application file for complete search history.

(56) References Cited

FOREIGN PATENT DOCUMENTS

| | | |
|---|---|---|
| JP | 2007002911 A | 1/2007 |
| JP | 2012091628 A | 5/2012 |
| WO | WO-2014141690 A1 | 9/2014 |
| WO | WO-2015141152 A1 | 9/2015 |
| WO | WO-2015141199 A1 | 9/2015 |
| WO | WO-2015141200 A1 | 9/2015 |
| WO | WO-2015174031 A1 | 11/2015 |

\* cited by examiner

GROUND CONTACT LENGTH

VEHICLE ERRONEOUS START CONTROL DEVICE

CROSS REFERENCE TO RELATED APPLICATIONS

This application is a U.S. National Phase Application under 35 U.S.C. 371 of International Application No. PCT/JP2015/001396 filed on Mar. 12, 2015 and published in Japanese as WO 2015/141201 A1 on Sep. 24, 2015. This application is based on and claims the benefit of priority from Japanese Patent Application No. 2014-054931 filed on Mar. 18, 2014. The entire disclosures of all of the above applications are incorporated herein by reference.

TECHNICAL FIELD

The present disclosure relates to a vehicle erroneous start control device that controls an intended start of a vehicle based on a detection signal provided from a vibration detection unit installed in a tire.

BACKGROUND ART

A patent literature 1 has proposed a vehicle erroneous start control device that controls an erroneous start of a vehicle caused by a driver's erroneous operation of a gear shift or a pedal. In this vehicle erroneous start control device, an in-vehicle camera or a radar detects a presence of an obstacle, such as a wall, in front of the vehicle. In a case where the vehicle is going to start even though the obstacle is present, the vehicle erroneous start control device controls the vehicle not to start erroneously, thereby to avoid a collision of the vehicle with the obstacle.

PRIOR ART LITERATURE

Patent Literature

Patent Literature 1: JP 2007-2911 A

SUMMARY OF INVENTION

By a technique of controlling an erroneous start by detecting the obstacle in front of the vehicle using the camera or the radar, an erroneous start in a frontward direction can be controlled. However, the technique cannot be used to control an erroneous start in a rearward direction. Also, in the technique using the camera or the radar, when a field of view is not well due to fog or smoke, or when an obstacle to be detected is a wire-netting fence, a plain wall or a wall with vertical stripe pattern, there is a possibility that the obstacle cannot be detected due to algorithm of an image processing.

It is an object of the present disclosure to provide a vehicle erroneous start control device that controls an erroneous start of a vehicle based on a vibration applied to a tire and is thereby capable of controlling the erroneous start irrespective of a poor visibility and an algorithm of an image processing.

According to an aspect of the present disclosure, a vehicle erroneous start control device includes a tire-side unit and a vehicle-side unit. The tire-side unit is attached to a rear surface of a tire tread of a vehicle. The tire-side unit includes a vibration detection unit that outputs a detection signal according to a magnitude of vibration of the tire, a vibration determination unit that determines whether the vibration of the tire is caused by a collision of the tire based on the detection signal of the vibration detection unit and outputs collision data indicating an occurrence of vibration due to the collision, and a transmitter that transmits the collision data. The vehicle-side unit includes a receiver that receives the collision data transmitted from the transmitter, a vehicle state detection unit that detects the vehicle being in a state of beginning to start, and an erroneous start determination unit that determines the vehicle is erroneously started when the vehicle is in the state of beginning to start as well as when the collision data has received.

In the vehicle erroneous start control device configured as above, the tire-side unit transmits the collision data when the vibration, which occurs in the event of collision of the tire with a wheel stop or the like, has been detected, and the vehicle-side unit receives the collision data transmitted and determines an erroneous start of the vehicle. Therefore, it is possible to control the erroneous start irrespective of the poor visibility or the algorithm of the image processing as in the technique of utilizing the camera or the radar.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Hereinafter, embodiments of the present disclosure will be described with reference to the drawings. In each of the embodiments described hereinafter, like or equivalent parts will be designated with the like reference numbers.

(First Embodiment)

A vehicle erroneous start control device according to the present embodiment will be described with reference to FIGS. 1 to 3. The vehicle erroneous start control device according to the present embodiment is used to control an erroneous start of a vehicle based on a vibration applied to each of wheels of the vehicle.

Figure 1:
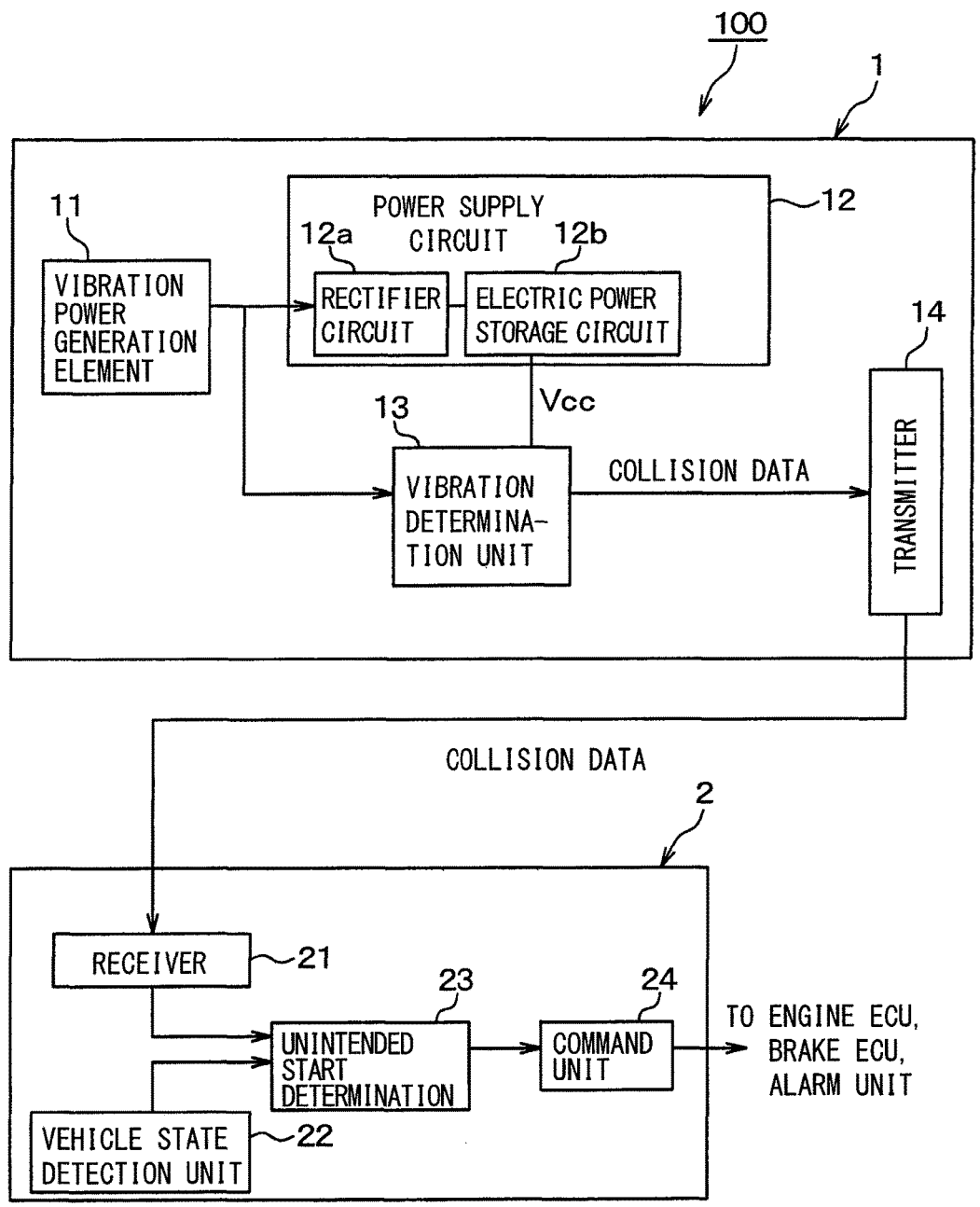
FIG. 1 is a block diagram illustrating an entire structure of a vehicle erroneous start control device according to a first embodiment of the present disclosure.

As shown in FIG. 1, the vehicle erroneous start control device 100 includes a tire-side unit 1 provided in a tire, and a vehicle-side unit 2 provided in a vehicle body. In the vehicle erroneous start control device 100, the tire-side unit 1 transmits collision data indicating that the tire has collided with a wheel stop or the like, and the vehicle-side unit 2 receives the collision data transmitted from the tire-side unit 1 and determines an erroneous start of the vehicle based on the collision data. When the vehicle-side unit 2 detects the erroneous start of the vehicle, the vehicle erroneous start control device 100 commands to control the erroneous start. Specifically, the tire-side unit 1 and the vehicle-side unit 2 are respectively configured as follows.

As shown in FIG. 1, the tire-side unit 1 includes a vibration power generation element 11, a power supply circuit 12, a vibration determination unit 13, and a transmitter 14. As shown in FIG. 2, the tire-side unit 1 is attached to a rear surface of a tread 31 of a tire 3.

Figure 2:
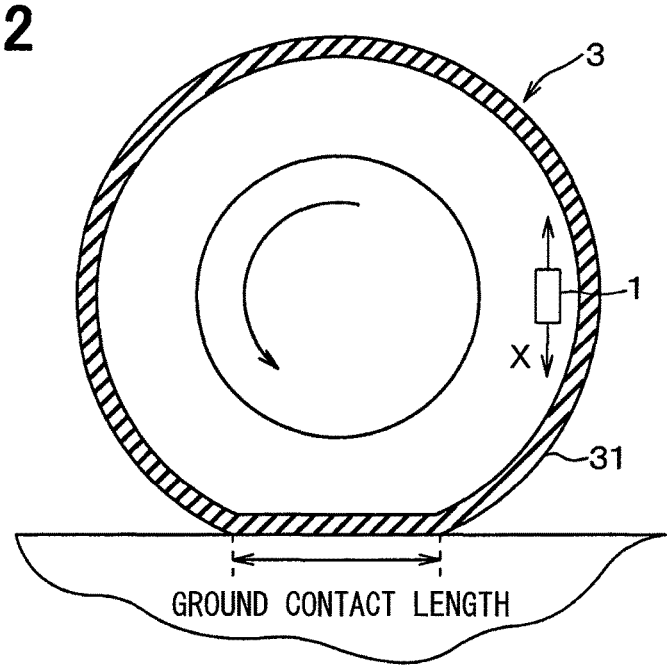
FIG. 2 is a diagram illustrating a schematic cross-sectional view of a tire equipped with a tire-side unit.

The vibration power generation element 11 functions as a vibration detection unit that outputs a detection signal according to a vibration in a tire tangential direction (a direction indicated by an arrow X in FIG. 2). The tire tangential direction is a direction tangential to a circular orbit of the tire-side unit 1 when the tire 3 rotates. In the present embodiment, the vibration power generation element 11 outputs the detection signal corresponding to the vibration in the tire tangential direction, as well as converts a vibration energy into an electric energy so as to generate a power source of the tire-side unit 1. For this reason, the vibration power generation element 11 is arranged so that an electric power is generated by the vibration in the tire tangential direction. For example, an electrostatic induction power generation element (electret), a piezoelectric element, a friction element, a magnetostrictive element, or an electromagnetic induction element can be used as the vibration power generation element 11. When only the detection signal corresponding to the vibration in the tire tangential direction needs to be output without considering an intended purpose of power generation, an acceleration sensor of different type or the like may also be used.

For example, suppose that the electrostatic induction power generation element is used as the vibration power generation element. In this case, when an upper electrode to be positively charged by electrostatic induction vibrates in a horizontal direction with respect to a lower electrode having negative charges, static charges caused by the electrostatic induction are varied, and an electromotive force is produced to generate an electric power. The power source of the tire-side unit 1 is generated by the electric power generated by the vibration power generation element 11, as well as the detection signal according to the magnitude of the vibration in the tire tangential direction is generated.

When the vehicle with the vehicle erroneous start control device 100 travels on a road, the tread 31 of the tire 3 vibrates due to various factors such as a rotational movement of the tire 3 and unevenness of a road surface. When the vibration is transferred to the vibration power generation element 11, the vibration power generation element 11 generates the electric power. The electric power generated is provided to the power supply circuit 12, thereby to generate the power source of the tire-side unit 1. An output voltage of the vibration power generation element during the power generation changes according to the magnitude of the vibration. Thus, the output voltage of the vibration power generation element 11 is also transmitted to the vibration determination unit 13 as a detection signal indicative of the magnitude of vibration in the tire tangential direction. The output voltage of the vibration generation element 11 is an AC voltage since the upper electrode reciprocates due to the vibration.

The power supply circuit 12 stores electricity on the basis of the output voltage of the vibration power generation element 11 to generate the power source. The power supply circuit 12 supplies electric power to the vibration determination unit 13 and the transmitter 14. The power supply circuit 12 includes a rectifier circuit 12a and an electric power storage circuit 12b.

The rectifier circuit 12a is a known circuit that converts the AC voltage output from the vibration power generation element 11 into a DC voltage. The AC voltage output from the vibration power generation element 11 is converted into a DC voltage by the rectifier circuit 12a, and is provided to the electric power storage circuit 12b. The rectifier circuit 12a may be configured by a full-wave rectifier circuit or a half-wave rectifier circuit.

The electric power storage circuit 12b stores the DC voltage applied from the rectifier circuit 12a. The electric power storage circuit 12b is provided by a capacitor or the like. The output voltage of the vibration power generation element 11 is stored in the electric power storage circuit 12b through the rectifier circuit 12a. The vibration determination unit 13 and the transmitter 14 of the tire-side unit 1 are supplied with the electric power utilizing the voltage stored in the electric power storage circuit 12b as the power source. Since the power supply circuit 12 has the electric power storage circuit 12b, when the vibration power generation element 11 excessively generates the electric power, the electric power storage circuit 12b stores the excessive amount of the electric power. When the amount of power generation is insufficient, the electric power storage circuit 12b compensates an insufficient amount of electric power with the stored power.

The vibration determination unit 13 includes a well-known microcomputer having various elements such as a CPU, a ROM, a RAM, and an I/O. The vibration determination unit 13 detects a collision of the tire 3 with a wheel stop or the like according to a program stored in the ROM or the like, and transmits the collision data indicative of the collision of the tire 3 to the transmitter 14. Specifically, the vibration determination unit 13 uses the output voltage of the vibration power generation element 11, for example, as a detection signal indicative of vibration data in the tire tangential direction. The vibration determination unit 13 processes the detection signal indicative of the vibration data in order to detect a vibration that occurs when the tire 3 has collided with a wheel stop or the like. Namely, the vibration determination unit 13 measures a change in the output voltage of the vibration power generation element 11 with time, and detects the vibration that occurs when the tire 3 has collided with the wheel stop or the like on the basis of the change in output voltage in the event of the collision of the tire 3 with the wheel stop or the like being larger than that during the normal rotation of the tire 3.

Figure 3:
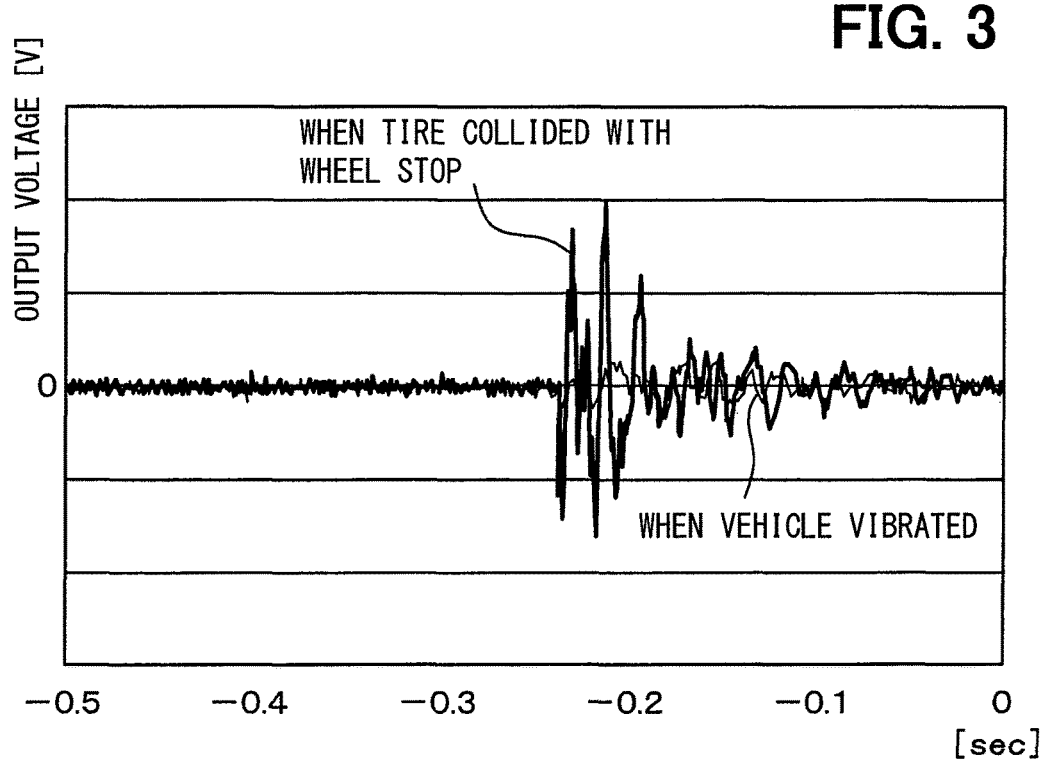
FIG. 3 is a diagram illustrating an output voltage waveform during a normal rotation of a tire and an output voltage waveform in the event of collision of tire to a wheel stop.

As shown in FIG. 3, for example, a waveform of the output voltage on the basis of a vibration occurring when the vehicle is vibrated and a waveform of the output voltage on the basis of the vibration occurring when the tire 3 collides with the wheel stop or the like are different, and peak values of the output levels are different. For this reason, a threshold is set to a value that is greater than a peak level assumed in an output voltage waveform on the basis of the vibration when the vehicle is vibrated and is smaller than a peak level assumed in an output voltage waveform in the event of the collision of the tire 3 with the wheel stop or the like. The vibration determination unit 13 determines that the tire 3 has collided with the wheel stop or the like when the output voltage generated exceeds the threshold, and provides the collision data indicative of the event of the collision of the tire 3 with the wheel stop or the like to the transmitter 14.

The vibration occurring when the vehicle is vibrated indicates a vibration applied to a tire when the vehicle body is vibrated during the halt of the vehicle. Even when a vibration of the vehicle body when the vehicle starts, such as a vibration caused by a passenger moving in a passenger compartment, is transferred to the tire 3, the waveform of the output voltage is different as described above. Therefore, it is less likely that the vibration determination unit 13 will erroneously determine that the tire 3 has collided with the wheel stop or the like.

The transmitter 14 transmits the collision data provided from the vibration determination unit 13 to the vehicle-side unit 2. Communication between the transmitter 14 and the receiver 12 of the vehicle-side unit 2 is, for example, implemented by a well-known short-distance-radio communication technique, such as Bluetooth (registered trademark). A timing to transmit the collision data is arbitrary. For example, the collision data is transmitted at a timing where it is determined that the tire 3 has collided with the wheel stop or the like, as a trigger. For example, as in the present embodiment, when the vibration detection unit is configured by the vibration power generation element 11, it may serve as a passive vibration sensor, and the electric power may be supplied to the transmitter only when the vibration determination unit 13 determines that the tire 3 has collided with the wheel stop or the like. In such a configuration, the collision data is transmitted from the transmitter 14 only when the power is supplied. In such a case, since an operation rate of the transmitter 14 can be controlled, the electric power consumed by the transmitter 14 can be reduced. As another example, the electric power supply from the electric power storage circuit 12 to the vibration determination unit 13 or the transmitter 14 is turned on based on an output pulse of the vibration power generation element 11 in the event of the collision of the tire 3 with the wheel stop as a trigger. Also in this case, the electric power consumption can be reduced similarly.

The collision data is transmitted together with a specified identification information (ID information) of a wheel, which is predetermined for each tire 3 of the vehicle. The position of each wheel can be specified by a well-known wheel position detection device that detects to which position the wheel is fixed. Therefore, it is possible to determine from which wheel the collision data has been transmitted by providing data indicative of a ground contact time period with the ID information to the vehicle-side unit 2. For example, as shown in FIG. 2, a ground contact length corresponds to a distance that begins at a time the tire-side unit 1 is at a rotational position (angle) opposing to the ground and ends at a time the tire-side unit 1 is at a rotational position (angle) separating from the ground, and a time period from the time the tire-side unit 1 is at the rotational position opposing to the ground to the time the tire-side unit 1 is at the rotational position separating from the ground can be regarded as the ground contact time period.

The vehicle-side unit 2 includes the receiver 21, a vehicle state detection unit 22, an erroneous start determination unit 23, and a command unit 24. The vehicle-side unit 2 receives the collision data transmitted from the tire-side unit 1, and performs various processing based on the collision data to determine an erroneous start of the vehicle.

The receiver 21 receives the collision data transmitted from the tire-side unit 1. The collision data received by the receiver 21 is output to the erroneous start determination unit 23 every time the receiver 21 receives the collision data.

The vehicle state detection unit 22, the erroneous start determination unit 23 and the command unit 24 are various functional elements configured by a well-known microcomputer including a CPU, a ROM, a RAM, and an I/O, and performs various processing according to program stored in the ROM.

The vehicle state detection unit 22 detects that the vehicle is in a state of beginning to start, and transmits the vehicle state to the erroneous start determination unit 23. For example, in a situation where the engine has started, and a vehicle speed is zero or equal to or less than a predetermined speed (e.g., 5 km/h), it is detected as the vehicle is in the state of beginning to start, and the vehicle state is transmitted to the erroneous start determination unit 23. An engine start information is, for example, managed by an electronic control unit for engine control (engine ECU), which is not illustrated, and a vehicle speed information is, for example, managed by an electronic control unit for brake control (brake ECU), which is not illustrated. The vehicle state detection unit 22 acquires these information through an in-vehicle network, such as CAN (controller area network), and detects that the vehicle is in the state of beginning to start.

The erroneous start determination unit 23 determines an erroneous start of the vehicle based on the collision data transmitted from the receiver 21 and a detection result of the vehicle state detection unit 22. For example, in the case where the erroneous start determination unit 23 has been informed of that the vehicle is in the state of beginning to start from the vehicle state detection unit 22, when the erroneous start determination unit 23 receives the collision data through the receiver 21, the erroneous start determination unit 23 determines that the vehicle is going to erroneously start in a direction different from a driver's intended direction. That is, when the vibration is generated due to the tire 3 colliding with the wheel stop or the like while the vehicle is going to start, there is a possibility that the vehicle is unintentionally starting. Therefore, it is determined as the erroneous start when such conditions are satisfied. When the erroneous start of the vehicle is determined, the erroneous start determination unit 23 provides a signal indicating of the erroneous start of the vehicle to the command unit 24.

The command unit 24 functions to provide a command for controlling the erroneous start of the vehicle. For example, the command unit 24 outputs a command signal for reducing a drive force to the engine ECU, or outputs a command signal for generating a braking force to the brake ECU. For this reason, the erroneous start of the vehicle that the vehicle erroneously starts in an unintended direction can be controlled. Also, it may be configured so that the erroneous start is alarmed by an alarm unit, which is not illustrated or displayed by a display device provided in an instrument panel, by the command signal from the command unit 24, to notify the driver of the erroneous start, thereby to control the erroneous start of the vehicle.

As described above, in the vehicle erroneous start control device 100 according to the present embodiment, when the tire-side unit 1 has detected the vibration of the collision of the tire 3 with the wheel stop or the like, the collision data is transmitted to the vehicle-side unit 2, and the vehicle-side unit 2 determines an erroneous start of the vehicle. As such, an erroneous start can be controlled irrespective of the poor visibility or the algorithm as in the technique of utilizing the camera or the radar.

(Other embodiments)

The present disclosure is not limited to the embodiment described hereinabove, but may be modified in various other ways.

In the embodiment described hereinabove, the erroneous start of the vehicle is determined based on the collision data transmitted from the tire-side unit 1 equipped to each of the wheels of the vehicle. For example, a determination criteria for determining the erroneous start may be set depending on from which wheel the collision data is transmitted. That is, when the collision data are transmitted from the tire-side units 1 of all the wheels, it is considered that the road surface on which the vehicle is travelling is a rough surface. In such a case, even when the collision data are transmitted, the erroneous start of the vehicle is not determined.

When the collision data is transmitted together with the ID information of the wheel, it is possible to determine whether the tire-side unit 1 transmitting the collision data is equipped to a front wheel or a rear wheel. For example, the vehicle state detection unit 22 acquires a shift position information as data regarding a traveling direction of the vehicle. When the collision data is transmitted from the tire-side unit 1 equipped to the wheel in the same direction as the vehicle traveling direction indicated by the shift position information, it can be determined as an erroneous start of the vehicle. For example, it is assumed that the vehicle is erroneously started in a forward direction from a forward parked state, while the driver intends to start the vehicle in a backward direction. In this case, when the shift lever is positioned to the forward position (D range) and the vehicle moves forward, a collision of a front wheel, which is on a side of the vehicle starting direction, with a wheel stop is detected. Based on this collision detection, the erroneous start can be determined.

In such a configuration, when the collision data is transmitted from the tire-side unit 1 that is on the same side as in the vehicle traveling direction when the vehicle moves over the roughness of the road surface when starting, an erroneous determination of the erroneous start of the vehicle can be restricted. Since it is properly determined whether the vibration is caused by the collision with the wheel stop or caused due to the roughness of the road surface in the traveling direction. Thus, the erroneous start of the vehicle can be more accurately determined.

In a situation where the road surface behind the vehicle has the roughness, even when the vehicle intentionally moves backward, there is a possibility that the vibration is detected in the rear wheel, and is misjudged as the collision with the wheel stop. Therefore, it is possible to add a switch for turning off the vehicle erroneous start control device. Also, it is possible to determine whether the vibration is caused by the collision with the wheel stop or the by the roughness of the road surface utilizing vibration data stored when the vehicle is parked.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A vehicle erroneous start control device comprising:
    a tire-side unit attached to a rear surface of a tread of a tire of a vehicle, the tire-side unit including
        a vibration detection unit that outputs a detection signal according to a magnitude of a vibration of the tire,
        a vibration determination unit that determines whether the vibration of the tire is caused by a collision of the tire based on the detection signal from the vibration detection unit and outputs collision data indicating that the vibration is caused by the collision, and
        a transmitter that transmits the collision data; and a vehicle-side unit including
        a receiver that receives the collision data transmitted from the transmitter,
        a vehicle state detection unit that detects that the vehicle is in a state of beginning to start, and
        an erroneous start determination unit that determines that the vehicle is erroneously started when the vehicle is in the state of beginning to start and when the collision data is received.

2. The vehicle erroneous start control device according to claim 1, wherein
    the vibration detection unit includes a vibration power generation element,
    the tire-side unit includes a power supply circuit that supplies electric power to the transmitter based on power generation in the vibration power generation element,
    the power supply circuit supplies the electric power to the transmitter when the vibration determination unit determines that the vibration is caused by the collision or based on an output pulse of the vibration power generation element as a trigger, and
    the transmitter transmits the collision data only when being supplied with the electric power.

3. The vehicle erroneous start control device according to claim 1, wherein
    the vehicle state detection unit acquires data regarding a travelling direction of the vehicle and notifies the traveling direction of the vehicle of the erroneous start determination unit, and
    the erroneous start determination unit determines that the vehicle is erroneously started when the collision data is transmitted from the tire-side unit that is equipped to the tire located in a same direction as the travelling direction of the vehicle.

4. The vehicle erroneous start control device according to claim 1, wherein
    the erroneous start determination unit determines that the vehicle is not erroneously started when the collision data is transmitted from all tire-side units equipped to front wheels and rear wheels of the vehicle.

* * * * *